US011842196B2

(12) United States Patent
Sartorius et al.

(10) Patent No.: US 11,842,196 B2
(45) Date of Patent: *Dec. 12, 2023

(54) OBSOLETING VALUES STORED IN REGISTERS IN A PROCESSOR BASED ON PROCESSING OBSOLESCENT REGISTER-ENCODED INSTRUCTIONS

(71) Applicant: Microsoft Technology Licensing, LLC, Redmond, WA (US)

(72) Inventors: Thomas Andrew Sartorius, Raleigh, NC (US); Thomas Philip Speier, Wake Forest, NC (US); Michael Scott McIlvaine, Raleigh, NC (US); James Norris Dieffenderfer, Apex, NC (US); Rodney Wayne Smith, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,517

(22) Filed: Nov. 9, 2021

(65) Prior Publication Data

US 2022/0066779 A1 Mar. 3, 2022

Related U.S. Application Data

(63) Continuation of application No. 16/699,808, filed on Dec. 2, 2019, now Pat. No. 11,188,334.

(51) Int. Cl.
*G06F 9/30* (2018.01)
*G06F 9/54* (2006.01)

(52) U.S. Cl.
CPC ...... *G06F 9/30145* (2013.01); *G06F 9/30047* (2013.01); *G06F 9/30101* (2013.01); *G06F 9/30105* (2013.01); *G06F 9/544* (2013.01)

(58) Field of Classification Search
CPC .................................................. G06F 9/30145
See application file for complete search history.

(56) References Cited

U.S. PATENT DOCUMENTS 5,872,949 A 2/1999 Kikuta et al.
6,092,175 A 7/2000 Levy et al.
(Continued)

OTHER PUBLICATIONS

Schlaeppi, et al., "Live/Dead Tags on Computer Registers," In IBM Technical Disclosure Bulletin, vol. 25, Issue 3A, Aug. 1, 1982, pp. 1304-1307.

(Continued)

*Primary Examiner* — Michael J Metzger
(74) *Attorney, Agent, or Firm* — Withrow & Terranova, PLLC

(57) ABSTRACT

Obsoleting values stored in registers in a processor based on processing obsolescent register-encoded instructions is disclosed. The processor is configured to support execution of read and/or write instructions that include obsolescence encoding indicating that one or more of its source and/or target register operands are to be obsoleted by the processor. A register encoded as obsolescent means the data value stored in such register will not be used by subsequent instructions in an instruction stream, and thus does not need to be retained. Thus, such register can be set as being in an obsolescent state so that the data value stored in such register can be ignored to improve performance. As one example, data values for registers having an obsolescent state can be ignored and thus not stored in a saved context for a process being switched out, thus conserving memory and improving processing time for a process switch.

23 Claims, 11 Drawing Sheets

(56) References Cited

U.S. PATENT DOCUMENTS

| | | | |
|---|---|---|---|
| 2002/0184473 | A1 | 12/2002 | Gold et al. |
| 2003/0182538 | A1 | 9/2003 | Gold et al. |
| 2010/0199074 | A1 | 8/2010 | Gemmeke et al. |
| 2013/0086362 | A1* | 4/2013 | Gschwind ............... G06F 9/384 |
| | | | 712/205 |
| 2013/0086363 | A1 | 4/2013 | Gschwind et al. |
| 2013/0086548 | A1 | 4/2013 | Gschwind et al. |
| 2016/0092222 | A1 | 3/2016 | Keppel et al. |
| 2019/0073218 | A1 | 3/2019 | Talluru et al. |
| 2020/0097296 | A1 | 3/2020 | Priyadarshi et al. |

OTHER PUBLICATIONS

Non-Final Office Action for U.S. Appl. No. 16/699,808, dated Feb. 4, 2021, 12 pages.
Final Office Action for U.S. Appl. No. 16/699,808, dated May 28, 2021, 6 pages.
Notice of Allowance for U.S. Appl. No. 16/699,808, dated Jul. 28, 2021, 7 pages.
"International Search Report and Written Opinion Issued in PCT Application No. PCT/US20/059008," dated Feb. 10, 2021, 15 Pages.
"Search Report Issued in European Patent Application No. 22184454. 1", dated Oct. 26, 2022, 7 Pages.
"Office Action Issued in European Patent Application No. 20816733. 8", dated Jun. 29, 2023, 4 Pages.
"Office Action Issued in European Patent Application No. 22184454. 1", dated Jun. 29, 2023, 4 Pages.

* cited by examiner

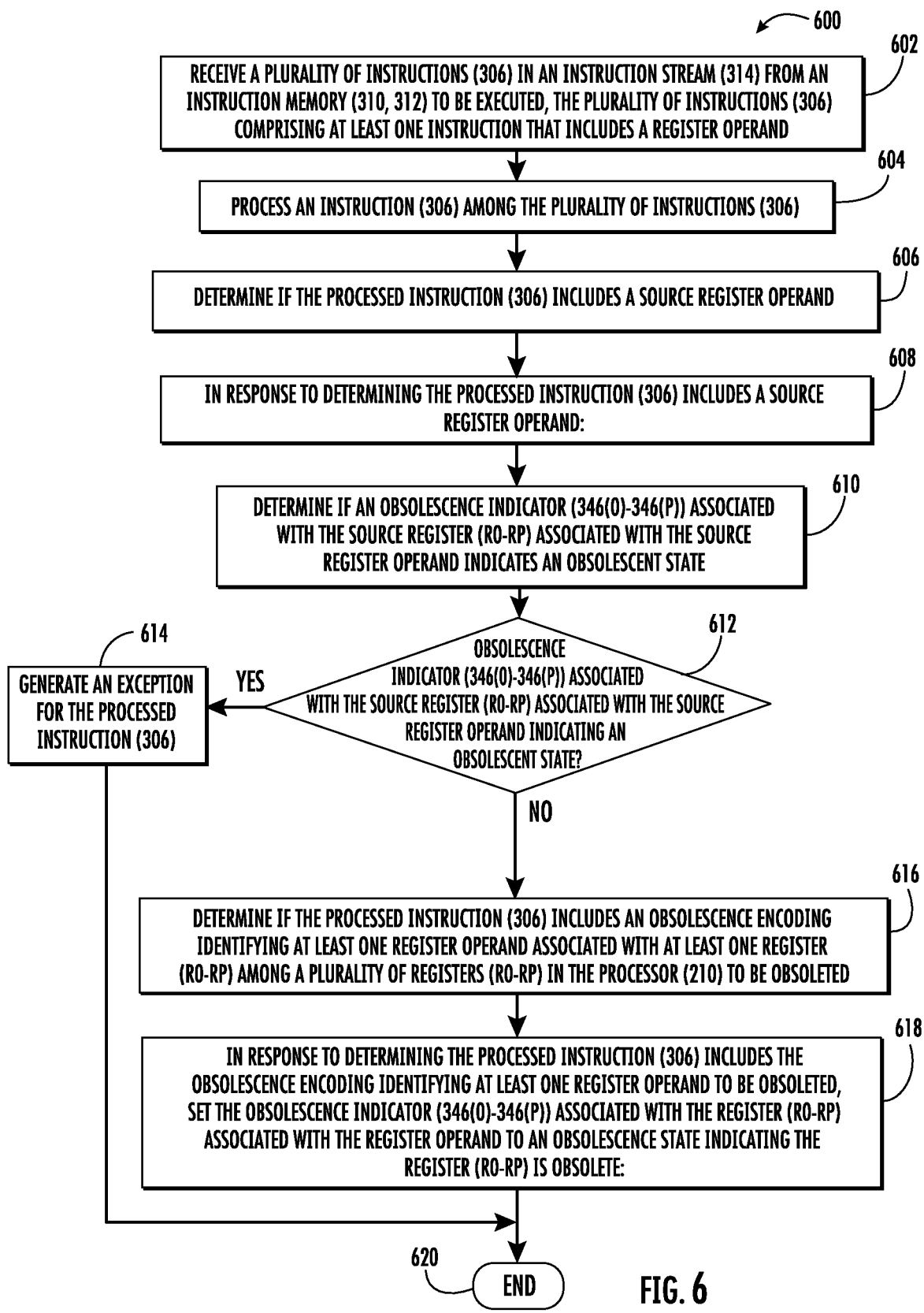

OBSOLETING VALUES STORED IN REGISTERS IN A PROCESSOR BASED ON PROCESSING OBSOLESCENT REGISTER-ENCODED INSTRUCTIONS

RELATED APPLICATION

The present application is a continuation of and claims priority to U.S. patent application Ser. No. 16/699,808, filed on Dec. 2, 2019, entitled "OBSOLETING VALUES STORED IN REGISTERS IN A PROCESSOR BASED ON PROCESSING OBSOLESCENT REGISTER-ENCODED INSTRUCTIONS," which is hereby incorporated herein by reference in its entirety.

FIELD OF THE DISCLOSURE

The technology of the disclosure relates to processor-based systems employing a central processor unit (CPU) that includes one or more processors each configured to execute computer instructions, and more particularly general purpose registers (GPRs) in a processor used to store and access values as source and target operands of executed instructions.

BACKGROUND

Microprocessors, also known as "processors," perform computational tasks for a wide variety of applications. A conventional microprocessor includes a central processing unit (CPU) that includes one or more processor cores, also known as "processors" or "CPU cores," that execute software instructions. The software instructions instruct a processor to perform operations based on data. The processor executes computer program instructions ("instructions"), also known as "software instructions," to perform operations based on data and generate a result, which is a produced value. An instruction that generates or writes a produced value is a "producer" instruction. The produced value may then be stored in a memory, provided as an output to an input/output ("I/O") device, or made available (i.e., communicated) as an input value to another "consumer" (e.g., a read/load) instruction executed by the processor, as examples.

The processors include instruction processing circuits configured to decode the fetched instructions for a given software process being executed by a respective processor into decoded instructions to determine the instruction type and actions required. The decoded instructions are placed in one or more of the instruction pipelines and processed based on source and target operands of the decoded instructions according to the instruction set architecture (ISA) of the processor. Conventionally, ISAs have been oriented around the use of general purpose registers (GPRs) as source and target operands, with the ISA encoding in instructions designating its sources and targets through encoding of GPR numbers. The values stored in these GPRs are "persistent," meaning that for each GPR, once a given instruction has written a result into it, that value in that GPR remains an "architecturally required" value available to any subsequent instruction that uses that GPR as a source operand. The value stored in GPRs are available up until the point that either some subsequent instruction writes a new value into that GPR or the processor gets "reset." Essentially, for any given software "process," the values in the GPRs are considered part of the "state" for that process. As such, the processor hardware must maintain the values of the GPRs, and software must take care to save and restore those values when a processor switches between different processes.

FIG. 1 is an exemplary set of computer software instructions 100 of a software process 102 that can be executed by a processor. The computer software instructions 100 include instructions I1-I11 that include instructions that name GPRs as source and/or target operands. In this example, instructions I1 and I2 are move (MOV) instructions that move immediate values into registers R0 and R1, respectively. The values in registers R0 and R1 are consumed by the add (ADD) write instruction I3 that loads the values stored in registers R0 and R1 and add these two values together and store (i.e., write) the result in register R2. As seen in the computer software instructions 100, registers R0 and R1 are overwritten by instructions I10 and I11 before the values stored in registers R0 and R1 are accessed again after the write instruction I3. So in this example, instructions I4-I9 in the software process 102 no longer need the values stored in registers R0 and R1 after execution of instruction I3 is complete. In short, the values stored in registers R0 and R1 have become obsolete after execution of instruction I3 is completed.

If instruction execution of the computer software instructions 100 were interrupted after execution of instruction I3 for example, the operating system software executing on the processor would decide to switch software processes executing on the processor. The software handling the process switch would be obligated to save the values currently stored in registers R0-RP at the time of the interrupt, including the values in registers R0 and R1, as part of the context of the software process 102 before a new software process and its context is switched into the processor to execute. This is so that when the software process 102 is switched back in to the processor to be executed, the previously stored context of the software process 102 that existed at the time of the interrupt can be restored in (switched into) the processor so that software process 102 can be executed where it was left out at the time of the interruption based on the correct context. This context restoration would include restoring the values stored in the registers R0-RP, including registers R0 and R1, for the software process 102 that existed at the time of the interruption. The operating system software has to expend processing cycles, and thus performance of the processor, storing and restoring the complete context of the interrupted software process 102 even though some values stored in the context, such as the values stored in registers R0 and R1 are never reused after execution of instruction I3.

SUMMARY

Aspects disclosed herein include obsoleting values stored in registers in a processor based on processing of obsolescent register-encoded instructions. Related methods and computer-readable media are also disclosed. The processor is in a central processing unit (CPU) that can include other processors (also known as CPU cores) as a multi-processor CPU. In exemplary aspects disclosed herein, the processor is configured to support execution of instructions that include obsolescence encoding ("obsolescent-encoded instructions") indicating that one or more of its source and/or target register operands are to be obsoleted by the processor. Such instructions may call for a source register to be read and/or a target register to be written. A register that is encoded as being obsolescent means that the data value stored in such register will not be used by subsequent instructions in an instruction stream, and thus does not need to be retained. For example, if a particular instruction is the last instruction in an instruction stream to read a data value from a source register indicated by a source operand before the source register is overwritten by another instruction, the data value stored in the source register will not be used after such last instruction. Thus, such source register can be obsoleted by the processor. In response to a processor processing an instruction having obsolescence encoding, an obsolescence indicator associated with a register indicated as being obsolescent can be set by processing such instruction to an obsolescent state to indicate that the data value stored in such register is no longer used.

In this manner, as one example, the processor setting an obsolescence indicator of a register to an obsolescent state in response to the processing of an obsolescence-encoded instruction allows the processor to ignore the data value stored in such register to improve performance. For example, data values for source registers having an obsolescent state can be ignored and not stored in a saved context for a process being switched out, thus conserving memory and improving processing time to perform a process switch. As another example, the processor may be configured to release renamed registers in a physical register file that are mapped to registers having an obsolescent state so that such renamed registers can be reallocated before such registers are overwritten to reduce the possibility of not having an available register that may incur a pipeline stall. As another example, a processor may be configured to ignore and not use data values stored in registers having an obsolescent state for speculative use of such data values when processing subsequent instructions, because such data values may be invalid. This can reduce re-execution processing that may occur as a result of using an invalid data value as a source value of an instruction. The processor can also be configured to generate an exception and/or use a default value for a data value read from a source register that is in an obsolescent state.

As discussed above, the processor supports instructions that have obsolescence encoding as part of its instruction set architecture (ISA). As one example, the ISA may support an obsolescence encoding for an instruction to cause a processor to immediately obsolesce a register after such obsolescence-encoded instruction is executed. The processor can be configured to recognize such encoding as immediately obsolescing a register after such obsolescence-encoded instruction is executed. As another example, the ISA may support obsolescence encoding for an instruction to cause a processor to obsolesce a register after a given number of instructions are executed in an instruction stream following such obsolescence-encoded instruction. The processor can be configured to recognize such encoding as obsolescing a register after a given number of instructions encoded in the obsolescence-encoded instruction are executed in the instruction stream following the obsolescence-encoded instruction. As another example, the ISA may support an obsolescence encoding for an instruction to cause a processor to obsolesce a register after a specified event following the execution of such obsolescence-encoded instruction. The processor can be configured to recognize such encoding as obsolescing a register after such event occurs and synchronize the setting of an obsolescence indicator for such register after such event occurs.

In this regard, in one exemplary aspect, a processor is provided. The processor is configured to receive a plurality of instructions in an instruction stream from an instruction memory to be executed, the plurality of instructions comprising at least one instruction that includes a register operand. The processor is also configured to process an instruction among the plurality of instructions and determine if the processed instruction includes an obsolescence encoding identifying at least one register operand associated with at least one register among a plurality of registers in the processor to be obsoleted. In response to determining the processed instruction includes the obsolescence encoding identifying at least one register operand to be obsoleted, the processor is also configured to set an obsolescence indicator associated with the at least one register associated with the at least one register operand to an obsolescent state indicating the at least one register is obsolete.

In another exemplary aspect, method of obsoleting a data value stored in a register in a processor is provided. The method comprises receiving a plurality of instructions in an instruction stream from an instruction memory to be executed, the plurality of instructions comprising at least one computer instruction that includes a register operand. The method also comprises processing an instruction among the plurality of instructions and determining if the processed instruction includes an obsolescence encoding identifying at least one register operand associated with at least one register among a plurality of registers in the processor to be obsoleted. In response to determining the processed instruction includes the obsolescence encoding identifying at least one register operand to be obsoleted, the method also comprises setting an obsolescence indicator associated with the at least one register associated with the at least one register operand to an obsolescent state indicating the at least one register is obsolete.

In another exemplary aspect, a non-transitory computer-readable medium having stored thereon an instruction program comprising a plurality of computer executable instructions for execution by a processor is provided. The plurality of computer-executable instructions comprises an obsolescence register-encoded instruction comprising an instruction type, one or more register operands, and obsolescence instruction type identifying at least one register among the one or more register operands to be obsoleted by the processor when executed.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is an exemplary set of computer software instructions that can be executed by a processor as an instruction stream, wherein the computer software instructions include named registers in the processor as source and target operands;

FIG. 2 is a diagram of an exemplary processor-based system that includes a central processing unit (CPU) that includes a plurality of CPU cores (i.e., processors), wherein each processor is configured to process an obsolescence register-encoded instruction indicating one or more registers to be made obsolescent and setting an obsolescence indicator(s) for such registers to cause the data value stored in such registers to be ignored;

FIG. 3 is a diagram of an exemplary instruction processing circuit that can be included in each processor in the CPU in FIG. 2 and that includes one or more instruction pipelines for processing computer instructions based on named source and/or target operands that can be registers (e.g., general purpose registers (GPRs)) in the processor, and wherein the processor is configured to process an obsolescence register-encoded instruction indicating one or more registers to be made obsolescent;

FIG. 6 is a flowchart illustrating an exemplary process that can be performed by a processor in FIG. 2 to process obsolescence register-encoded instructions to set an obsolescence indicator for a source register encoded as being obsolescent;

Figure 1:
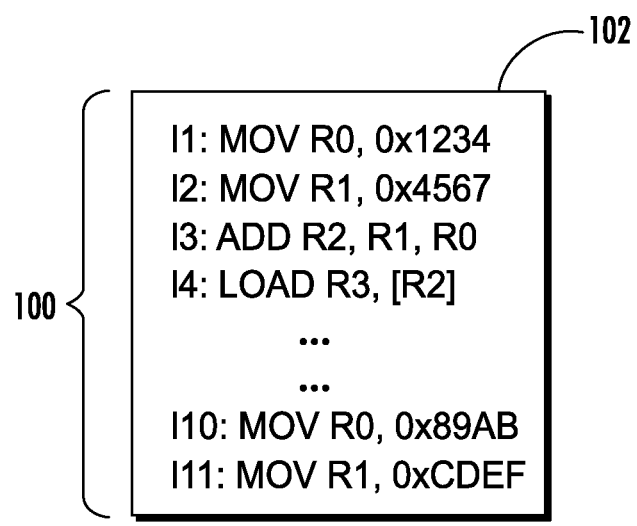
Figure 2:
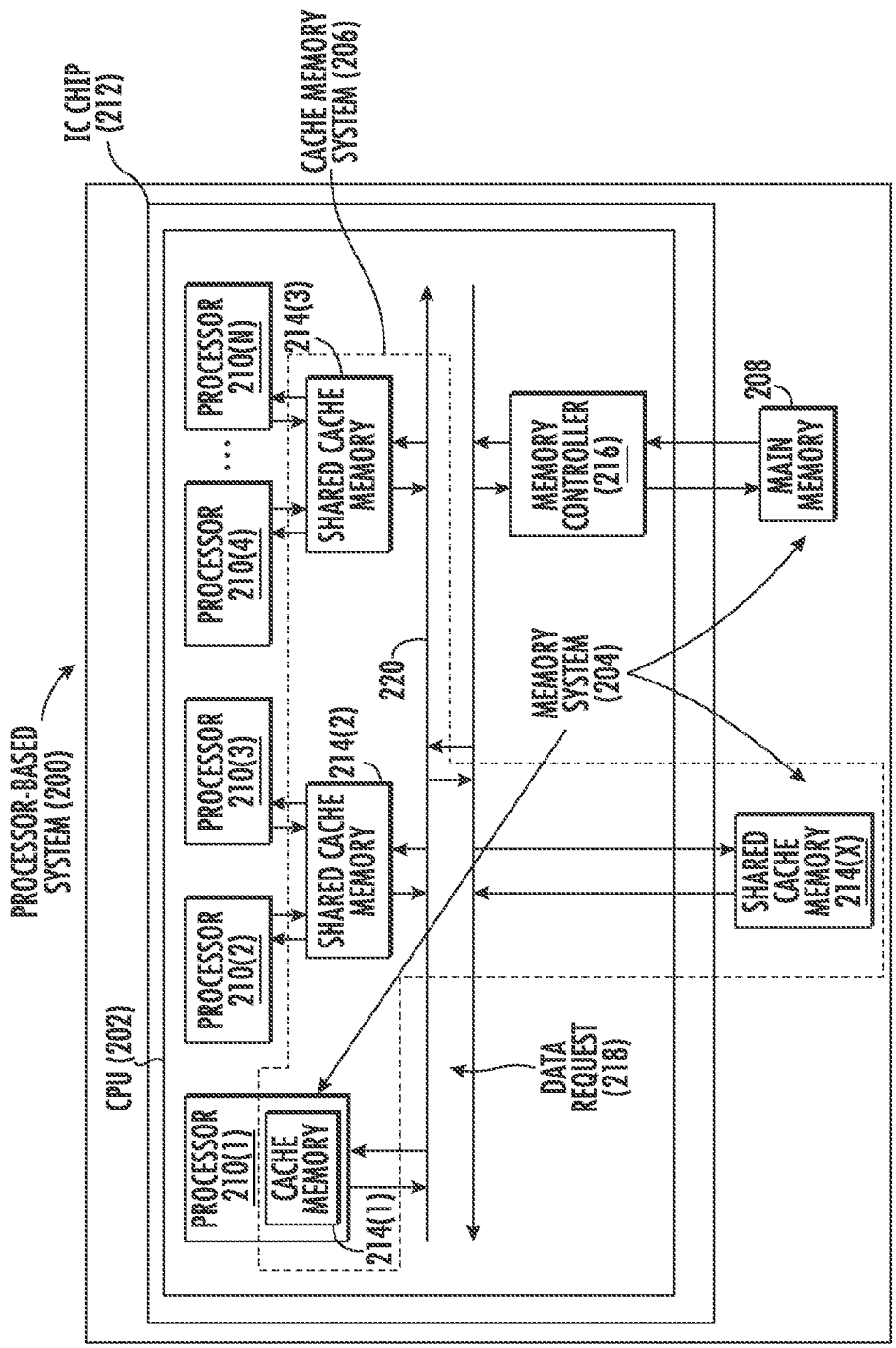
Figure 3:
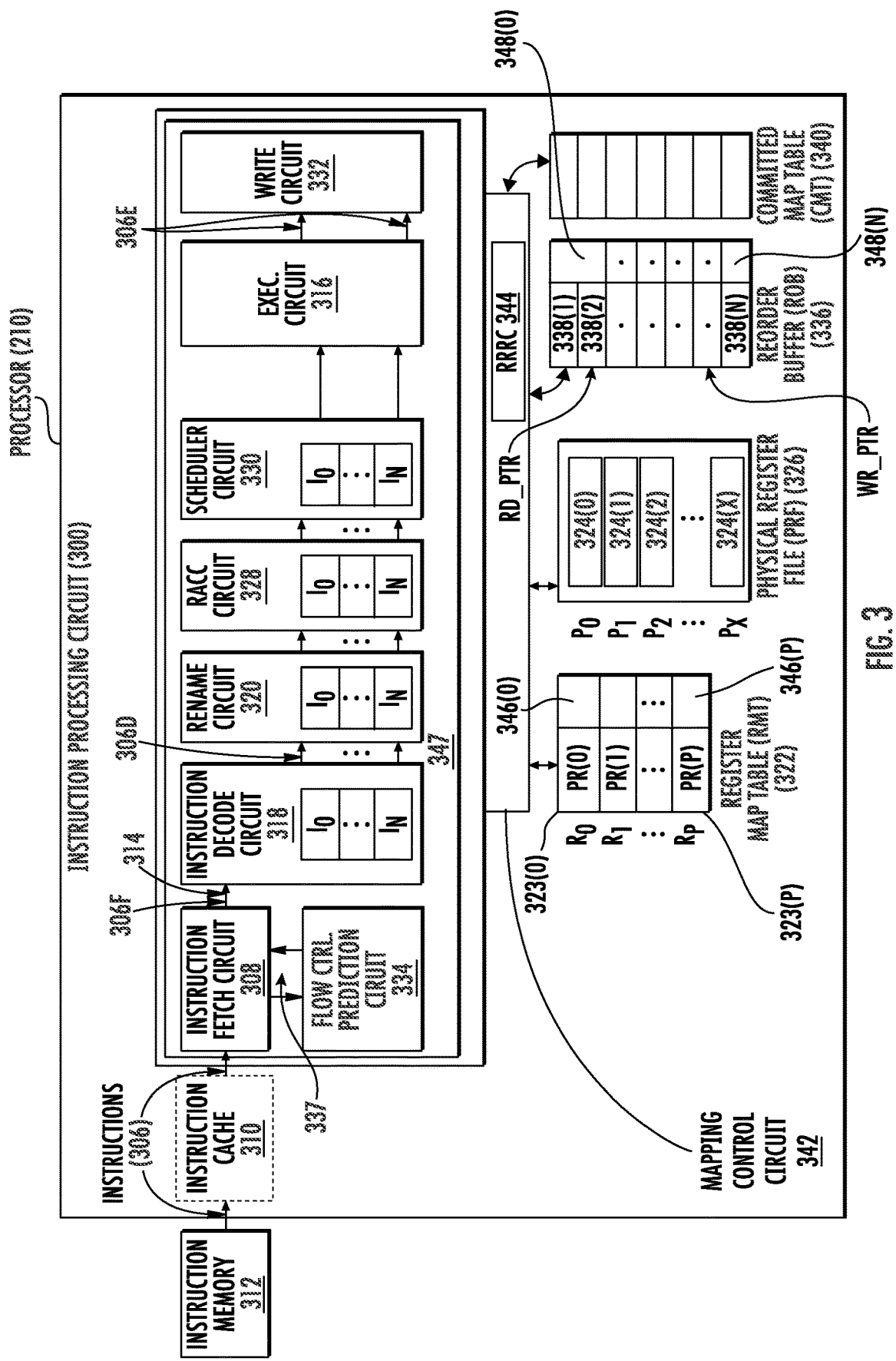
Figure 7:
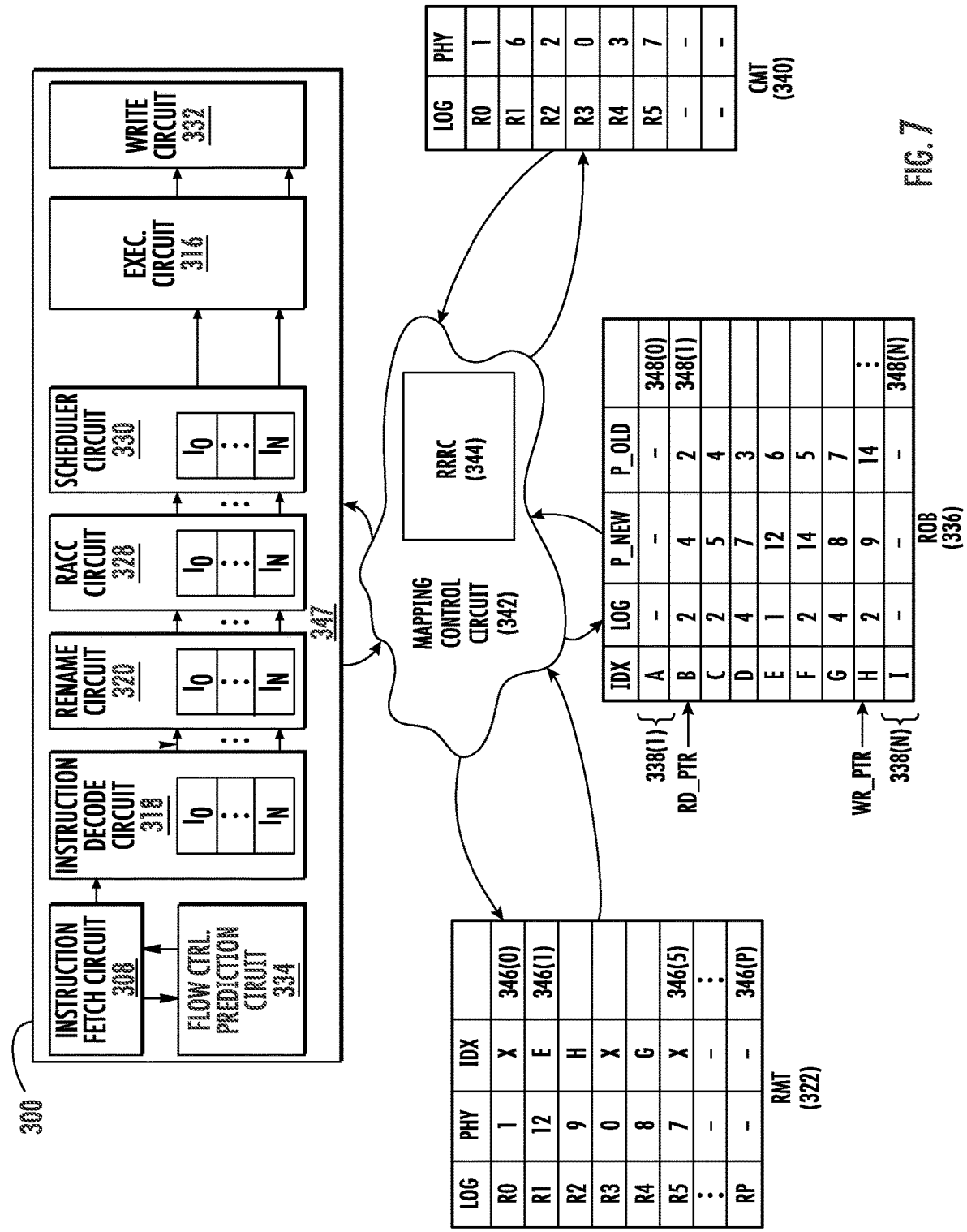
FIG. 7 is a diagram of the instruction processing circuit in FIG. 2 that illustrates an example of obsolescence indicators being set by the processor for a source register indicated as being obsolescent in response to processing obsolescence register-encoded instructions.
Figure 9A:
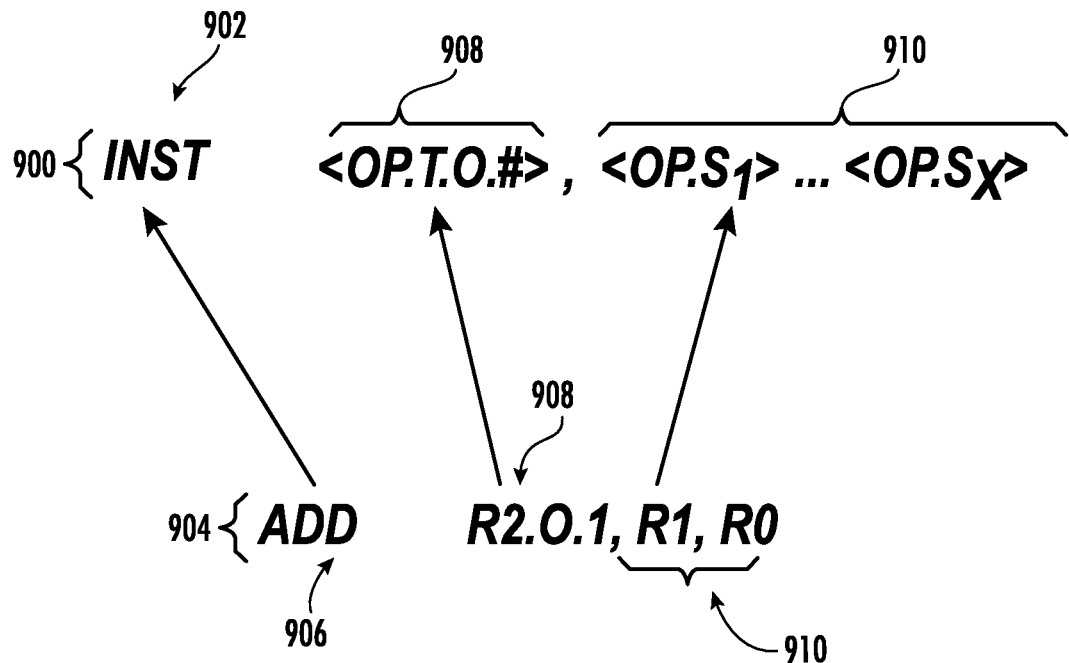
FIG. 9A illustrates an exemplary obsolescence register-encoded instruction that can be processed by the processor in FIG. 2 in an instruction stream to cause the processor to set an obsolescence indicator to an obsolescent state for a target register after a given number of subsequent instructions are executed in the instruction stream.
Figure 9B:
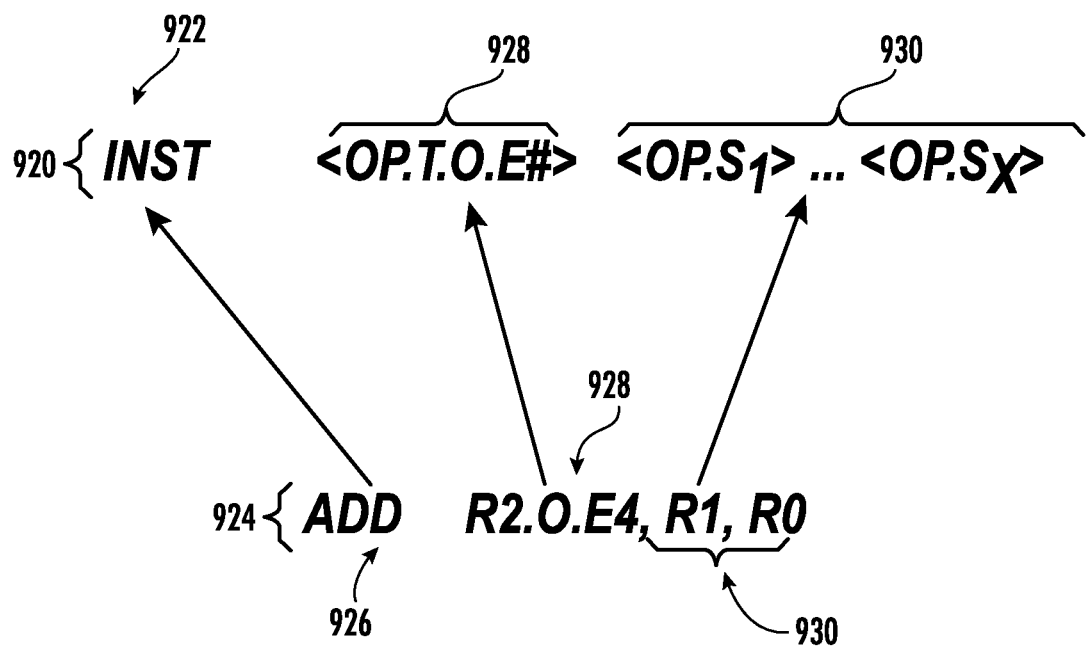
Figure 10:
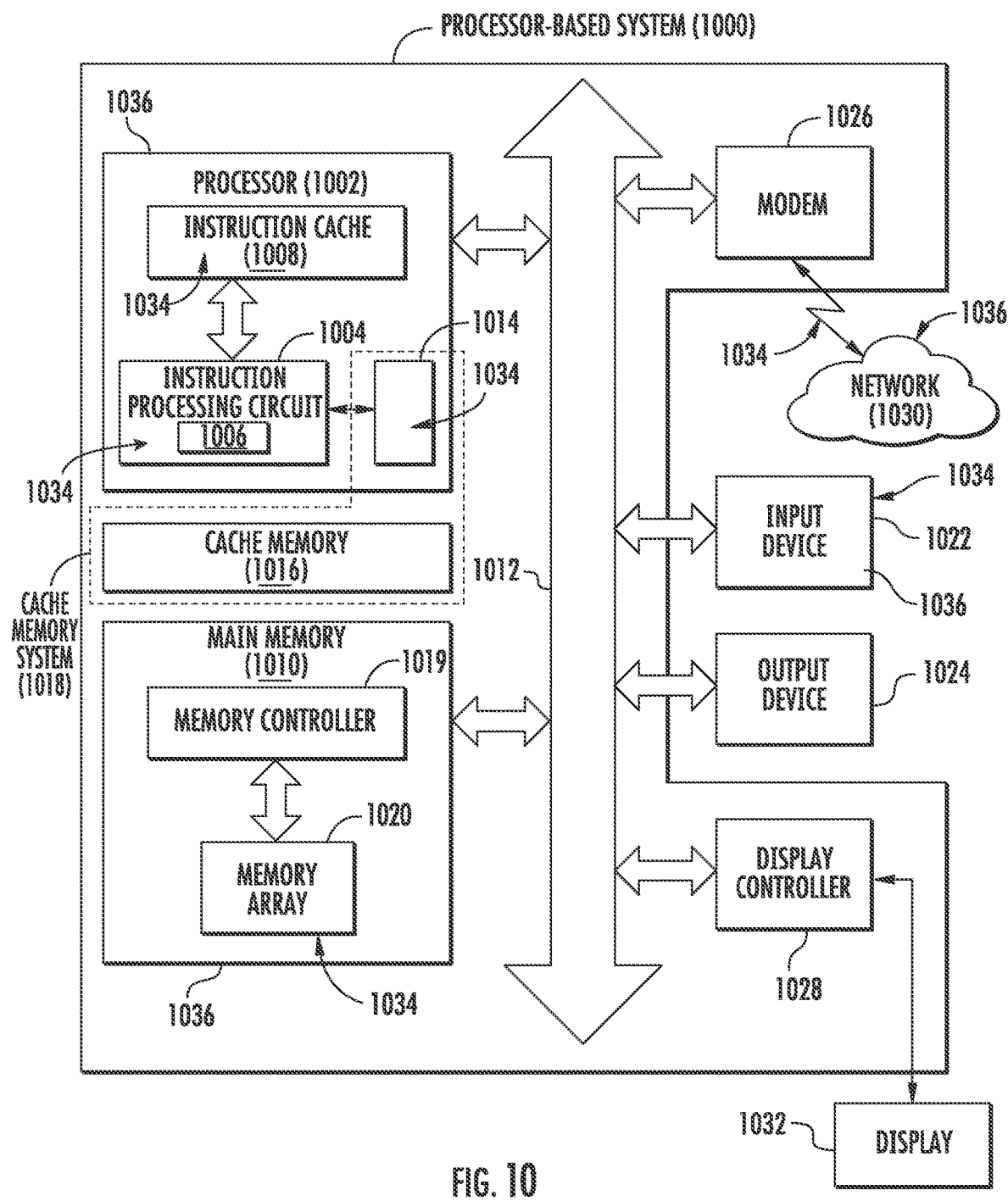

FIG. 9B illustrates an exemplary operand obsolescence register-encoded instruction that can be processed by the processor in FIG. 2 in an instruction stream to cause the processor to set an obsolescence indicator to an obsolescent state for a target register after a specified event occurs; and FIG. 10 is a block diagram of an exemplary processor-based system includes a processor configured to process an obsolescence register-encoded instruction indicating one or more registers to be made obsolescent and setting an obsolescence indicator(s) for such registers to cause the data value stored in such registers to be ignored, including but not limited to the processor in FIGS. 2, 3, and 7.

DETAILED DESCRIPTION

Aspects disclosed herein include obsoleting values stored in registers in a processor based on processing of obsolescent register-encoded instructions. Related methods and computer-readable media are also disclosed. The processor is in a central processing unit (CPU) that can include other processors (also known as CPU cores) as a multi-processor CPU. In exemplary aspects disclosed herein, the processor is configured to support execution of instructions that include obsolescence encoding ("obsolescent-encoded instructions") indicating that one or more of its source and/or target register operands are to be obsoleted by the processor. Such instructions may call for a source register to be read and/or a target register to be written. A register that is encoded as being obsolescent means that the data value stored in such register will not be used by subsequent instructions in an instruction stream, and thus does not need to be retained. For example, if a particular instruction is the last instruction in an instruction stream to read a data value from a source register indicated by a source operand before the source register is overwritten by another instruction, the data value stored in the source register will not be used after such last instruction. Thus, such source register can be obsoleted by the processor. In response to a processor processing an instruction having obsolescence encoding, an obsolescence indicator associated with a register indicated as being obsolescent can be set by processing such instruction to an obsolescent state to indicate that the data value stored in such register is no longer used.

In this manner, as one example, the processor setting an obsolescence indicator of a register to an obsolescent state in response to the processing of an obsolescence-encoded instruction allows the processor to ignore the data value stored in such register to improve performance. For example, data values for source registers having an obsolescent state can be ignored and not stored in a saved context for a process being switched out, thus conserving memory and improving processing time to perform a process switch. As another example, the processor may be configured to release renamed registers in a physical register file that are mapped to registers having an obsolescent state so that such renamed registers can be reallocated before such registers are overwritten to reduce the possibility of not having an available register that may incur a pipeline stall. As another example, a processor may be configured to ignore and not use data values stored in registers having an obsolescent state for speculative use of such data values when processing subsequent instructions, because such data values may be invalid. This can reduce re-execution processing that may occur as a result of using an invalid data value as a source value of an instruction. The processor can also be configured to generate an exception and/or use a default value for a data value read from a source register that is in an obsolescent state.

Before discussing examples of a processor obsoleting values stored in registers in a processor based on processing obsolescent register-encoded instructions, an exemplary processing-based system that includes a CPU with one or more processors is first discussed with regard to FIGS. 2 and 3.

FIG. 2 is a diagram of an exemplary processor-based system 200 that includes a central processing unit (CPU) 202. The CPU 202 is configured to issue memory requests (i.e., data read and data write requests) to a memory system 204 that includes a cache memory system 206 and a main memory 208. For example, the main memory 208 may be a dynamic random access memory (DRAM) provided in a separate DRAM chip. The CPU 202 includes one or more respective processors 210(1)-210(N), wherein 'N' is a positive whole number representing the number of processors included in the processor 210. As will be discussed in more detail below, the processors 210(1)-210(N) are each configured to obsolete values stored in their registers (e.g., general purpose registers (GPRs)) based on processing obsolescent register-encoded instructions in an instruction stream. The CPU 202 can be packaged in an integrated circuit (IC) chip 212. The cache memory system 206 includes one or more cache memories 214(1)-214(X) that may be at different hierarchies in the processor-based system 200 and that are logically located between the processors 210(1)-210(N) and the main memory 208, where 'X' is a positive whole number representing the number of processors included in the CPU 202. A memory controller 216 controls access to the main memory 208.

For example, a processor 210(1)-210(N) as a requesting device may issue a data request 218 to read data in response to processing a load instruction. The data request 218 includes a target address of the data to be read from memory. Using processor 210(1) as an example, if the requested data is not in a private cache memory 214(1) (i.e., a cache miss to cache memory 214(1)), which may be considered a level one (L1) cache memory, the private cache memory 214(1) sends the data request 218 over an interconnect bus 220 in this example to a shared cache memory 214(X) shared with all of the processors 210(1)-210(N), which may be a level (3) cache memory. The requested data in the data request 218 is eventually either fulfilled in a cache memory 214(1)-214(X) or the main memory 208 if not contained in any of the cache memories 214(1)-214(X).

FIG. 3 illustrates an instruction processing circuit 300 that can be provided in a processor 210 in the CPU 202 in FIG. 2. The instruction processing circuit 300 includes one or more instruction pipelines $I_0$-$I_N$ for processing fetched computer instructions 306F fetched by an instruction fetch circuit 308 for execution from a series of instructions 306 stored in an instruction cache memory 310 or instruction memory 312, as examples. The instruction fetch circuit 308 is configured to provide fetched instructions 306F into the one or more instruction pipelines $I_0$-$I_N$ as an instruction stream 314 in the instruction processing circuit 300 to be pre-processed before the fetched instructions 306F reach an execution circuit 316 to be executed. The instruction pipelines $I_0$-$I_N$ are provided across different processing circuits or stages of the instruction processing circuit 300 to pre-process and process the fetched instructions 306F in a series of steps that can be performed concurrently to increase throughput prior to execution of the fetched instructions 306F by the execution circuit 316.

As will be discussed in more detail below, instructions 306F in the instruction stream 314 can include obsolescent register-encoded instructions that are encoded such that when processed by a processor 210, an encoded register operand in the obsolescent register-encoded instruction is obsoleted by the processor 210. This allows a data value stored in a register indicated as having obsoleted data to be ignored in various processing to improve performance of the CPU 202.

With continuing reference to FIG. 3, the instruction processing circuit 300 includes an instruction decode circuit 318 configured to decode the fetched instructions 306F fetched by the instruction fetch circuit 308 into decoded instructions 306D to determine the instruction type and actions required. The decoded instructions 306D are placed in one or more of the instruction pipelines $I_0$-$I_N$ and are next provided to a rename circuit 320 in the instruction processing circuit 300 to determine if any register names in the decoded instructions 306D need to be renamed to break any register dependencies that would prevent parallel or out-of-order processing. The rename circuit 320 is configured to call upon a register map table (RMT) 322 to rename a logical source register operand and/or write a destination register operand of a decoded instruction 306D to available physical registers 324(0)-324(X) (P0, P1, PX) in a physical register file (PRF) 326. The RMT 322 contains a plurality of mapping entries 323(0)-323(P) each mapped to (i.e., associated with) a respective logical register R0-RP. The mapping entries 323(0)-323(P) are each configured to store respective mapping information PR(0)-PR(P) in the form of an address pointer in this example to point to a physical register 324(0)-324(X) in the PRF 326. Each physical register 324(0)-324(X) in the PRF 326 is configured to store a data entry for the source and/or destination register operand of a decoded instruction 306D.

The instruction processing circuit 300 also includes a register access (RACC) circuit 328 configured to access a physical register 324(0)-324(X) in the PRF 326 based on a mapping entry mapped to a logical register R0-RP in the RMT 322 of a source register operand of a decoded instruction 306D to retrieve a produced value from an executed instruction 306E in the execution circuit 316. Also, in the instruction processing circuit 300, a scheduler circuit 330 is provided in the instruction pipelines $I_0$-$I_N$ and is configured to store decoded instructions 306D in reservation entries until all source register operands for the decoded instructions 306D are available. A write circuit 332 is also provided in the instruction processing circuit 300 to write back or commit produced values from executed instructions 306E to memory, such as the PRF 326, the cache memory system 206 (FIG. 2), or the main memory 208 (FIG. 2).

With continuing reference to FIG. 3, the instruction processing circuit 300 also includes a flow control prediction circuit 334. The flow control prediction circuit 334 is configured to speculatively predict the outcome of a condition of a fetched conditional flow control instruction 306F, such as a conditional branch instruction, that controls whether the taken or not taken path in the instruction control flow path of the instruction stream 314 is fetched into the instruction pipelines $I_0$-$I_N$ for execution. In this manner, the condition of the fetched conditional flow control instruction 306F does not have to be resolved in execution by the execution circuit 316 before the instruction processing circuit 300 can continue processing speculatively fetched instructions 306F. The prediction made by the flow control prediction circuit 334 can be provided as prediction information 337 to the instruction fetch circuit 308 to be used by the instruction fetch circuit 308 to determine the next instructions 306 to fetch.

However, if the condition of the conditional flow control instruction 306F is determined to have been mispredicted when the conditional flow control instruction 306F is executed in the execution circuit 316, the instruction 306F is interrupted. The speculatively fetched instructions 306F that were processed in the instruction processing circuit 300 after the conditional flow control instruction 306F are flushed because the direction of program flow is changed and will not include processing of these instructions. Load or store instructions 306F for which a calculated address of a memory location may be invalid or cannot be accessed for some other reason can also cause a flush of subsequent instructions 306F. The program flow of the instruction processing circuit 300 is interrupted under these conditions, and the instruction processing circuit 300 is returned to a previous state. The previous state to which the processor is restored depends on the type of interrupted instruction 306F and may be a state that existed either prior to or as a result of the instruction 306F that is interrupted ("interrupting instruction"). In particular, the present disclosure is directed to recovering the previous state of the RMT 322 to restore logical register-to-physical register mappings that have been changed by instructions that entered the instruction processing circuit 300 after the interrupting instruction 306 ("younger instructions").

With continuing reference to FIG. 3, the instruction processing circuit 300 also includes an optional reorder buffer (ROB) 336 containing entries ("ROB entries") 338 (1)-338(N) allocated to each instruction 306 that is being processed by the instruction processing circuit 300, but has not yet been committed. A ROB 336 can be used if the CPU is an out-of-order processor that is configured to execute instructions 306F out of order. A ROB index identifies the position of each ROB entry 338(1)-338(N) in the ROB 336. The ROB entries 338(1)-338(N) are allocated sequentially in program order to instructions 306. The ROB index for each instruction 306 is reported back to the instruction processing circuit 300 when the ROB entry 338(1)-338(N) is initially allocated. In this manner, the instruction processing circuit 300 can associate a ROB index to the interrupting instruction. Information about changes to the mapping of the logical registers R0-RP as a result of an instruction 306 is stored in the ROB entry 338(1)-338(N) corresponding to the instruction 306.

The ROB 336 includes a Read Pointer RD_PTR pointing to the ROB index of the ROB entry 338(1)-338(N) from which information about the oldest uncommitted instruction 306 is read when it is committed. The Read Pointer RD_PTR is updated each time an uncommitted instruction 306 is committed. The ROB 336 also includes a Write Pointer WR_PTR indicating the ROB index of the last ROB entry 338(1)-338(N) to which information is written about the youngest uncommitted instruction 306. When an instruction 306 updates a logical register-to-physical register mapping of a logical register R0-RP in the RMT 322, the ROB index of a ROB entry 338(1)-338(N) of the instruction 306 is associated with that logical register R0-RP. Therefore, the ROB index corresponding to the last instruction 306 that updated the mapping of a logical register R0-RP is stored in the RMT 322 with the entry for the logical register R0-RP.

With continuing reference to FIG. 3, the instruction processing circuit 300 also includes a committed map table (CMT) 340 which stores the logical register-to-physical register mapping of each logical register R0-RP of the processor 210 as a result of committed instructions 306. The CMT 340 is only updated when an instruction 306 is committed. The CMT 340 is not changed by the recovery of the RMT 322 in response to a flush. The instruction processing circuit 300 also includes a mapping control circuit 342, which includes a register rename recover circuit (RRRC) 344 for controlling the RMT flush recovery. The mapping control circuit 342 is configured to allocate new ROB entries 338(1)-338(N) to new instructions 306 entering the instruction pipeline $I_0$-$I_N$ and set the Write Pointer WR_PTR accordingly. Therefore, the ROB entries 338(1)-338(N) may also be referred to herein as instruction entries 338(1)-338(N). The mapping control circuit 342 also deallocates a ROB entry 338(1)-338(N) when an oldest uncommitted instruction 306 is committed. This includes moving the Read Pointer RD_PTR to the next oldest uncommitted instruction.

As discussed above and in more detail below, the processor 210 can be configured to process an obsolescence register-encoded instruction 306 in the instruction stream 314 to indicate that a logical register R0-RP is obsolescent. In this example, the RMT 322 is appended with obsolescence indicators 346(0)-346(P) to provide storage for the processor 210 to record and track the obsolescent state of the logical registers R0-RP based on the processing of obsolescence register-encoded instructions 306. For example, the obsolescence indicators 346(0)-346(P) may be a bit in size and configured to store a '1' bit to indicate that an associated logical register R0-RP in an obsolescent state meaning obsolescent, and a '0' bit to indicate that an associated logical register R0-RP in a non-obsolescent state meaning not obsolescent. The processor 210 can be configured to set an obsolescence indicator 346(0)-346(P) for a logical register R0-RP to the obsolescent state when so encoded in a processed obsolescence register-encoded instruction 306. The processor 210 can be configured to set an obsolescence indicator 346(0)-346(P) for a logical register R0-RP to the non-obsolescent state when the logical register is overwritten by a subsequent instruction following execution of the obsolescence register-encoded instruction 306 that caused the obsolescence indicator 346(0)-346(P) to be set to the obsolescent state.

With continuing reference to FIG. 3, as discussed above and in more detail below, the processor 210 may also be configured to record an obsolescent state in response to processing an obsolescence register-encoded instruction 306 in the instruction stream 314 within the ROB 336. In this example, the ROB 336 can be appended with obsolescence indicators 348(0)-348(P) that are associated with respective ROB entries 338(1)-338(N) to provide an indication for the processor 210 that the instruction in a given ROB entry 338(1)-338(N) has a register operand that was set to be obsolete by the processor 210 in response to processing an obsolescence register-encoded instruction 306. For example, the obsolescence indicators 348(0)-348(P) may be a bit in size and configured to store a '1' bit to indicate that an associated instruction has an operand for logical register R0-RP in an obsolescent state meaning obsolescent, and a '0' bit to indicate that an associated instruction has an operand for logical register R0-RP in a non-obsolescent state meaning not obsolescent. In this manner, if the processor 210 performs a flush operation in response to an interruption event, the obsolescence indicators 348(0)-348(P) can be consulted to restore the RMT 322 to a state that existed prior to the interruption. The obsolescence indicators 348(0)-348(P) can be used by the processor 210 to determine the ROB entry 338(1)-338(N) with the oldest instruction entry for example that has obsolescence indicator 348(0)-348(P) set to a non-obsolescent state so that RMT 322 is restored to values for instructions that have been committed and did not execute on a data value from a logical register R0-RP that was obsolescent.

Figure 4:
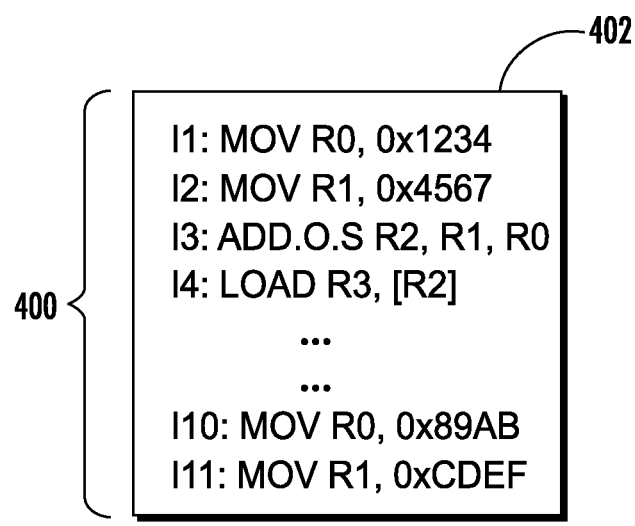
FIG. 4 is a set of computer software instructions that can be executed by a processor as an instruction stream, wherein the computer software instructions include obsolescence register-encoded instructions encoded to instruct the processor to obsolete a source register identified by a source register operand.

FIG. 4 is a set of computer software instructions 400 of an instruction stream 402 that can be executed by the instruction processing circuit 300 of the processor 210 in FIG. 3 as the instruction stream 314, wherein the computer software instructions 400 include obsolescence register-encoded instructions. The computer software instructions 400 include instructions I1-I11 that include instructions that name GPRs as source and/or target operands. In this example, instructions I1 and I2 are move (MOV) instructions that move immediate values as data values into source registers R0 and R1 identified by respective source register operands in instructions I1 and I2, respectively. These data values loaded in registers R0 and R1 are consumed by the add (ADD) instruction I3 which accesses the values stored in registers R0 and R1 and adds these two values together to store (i.e., write) the result in target register R2 identified by target register operand R2 in instruction I3.

As seen in the computer software instructions 400, registers R0 and R1 are overwritten by instructions I10 and I11 before the values stored in registers R0 and R1 are accessed again after the write instruction I3. In this regard, in this example, instruction I3 is encoded as obsolescence register-encoded instruction. This is notated in this example by their instruction type "ADD.O.S" indicating an add instruction with an '.O' notation indicating an obsolescence register-encoded instruction and '.S' meaning source registers. This notation as an example can be used with a compiler that is compatible with an ISA that includes obsolescence register-encoded instructions according to the desired format. As will be discussed below, other obsolescence encoding formats are possible. In this example, instruction I3 is encoded as an obsolescence register-encoded instruction with the "ADD.O.S" instruction type, meaning that all provided source registers, which are registers R0 and R1 respectively in this example, are to be obsoleted by the processor 210 after instruction I3 is processed. As will be discussed below, in response to the processor 210 processing instruction I3, registers R0 and R1 will be indicated as containing obsolete data values so that these data values can be ignored for various performance reasons. The reason this is possible in this example is because as shown in the computer software instructions 400, instructions I4-I9 do not access registers R0 and R1 as source registers after execution of instruction I3 is complete before the data values stored in registers R0 and R1 are overwritten by instructions I10 and I11.

As will be discussed in more detail below, the processor 210 being capable of processing an obsolescent register-encoded instruction allows the processor 210 to later ignore the data value stored in such register to improve performance. For example, data values for source registers that are noted as obsolescent can be ignored and not stored in a saved context for a process being switched out, thus conserving memory and improving processing time to perform a process switch. If execution of the computer software instructions 400 were interrupted after execution of instruction I3 for example, operating system software executing on the processor 210 could decide to switch software processes executing on the processor 210. The software handling the process switch would be obligated to save the values currently stored in physical registers P0-PX at the time of the interrupt, including the physical registers P0-PX mapped to registers R0 and R1 in the RMT 322 (FIG. 3), as part of the context of the current process before a new software process and its context is switched into the processor 210 to execute. This is so that when the previous software process is switched back into the processor 210 to be executed, the previously stored context of the software process that existed at the time of the interrupt can be restored in (switched into) the processor 210 so that software process can be executed where it was left out at the time of the interruption based on the current context. However, if registers R0 and R1 in the RMT 322 were designated as obsolete, the data values stored in the physical registers P0-PX mapped to registers R0 and R1 would be obsolete and thus would not have to be stored for the current context. Thus, the operating system software could avoid expending processing cycles storing data for obsolete registers to save processing time and memory.

Figure 5A:
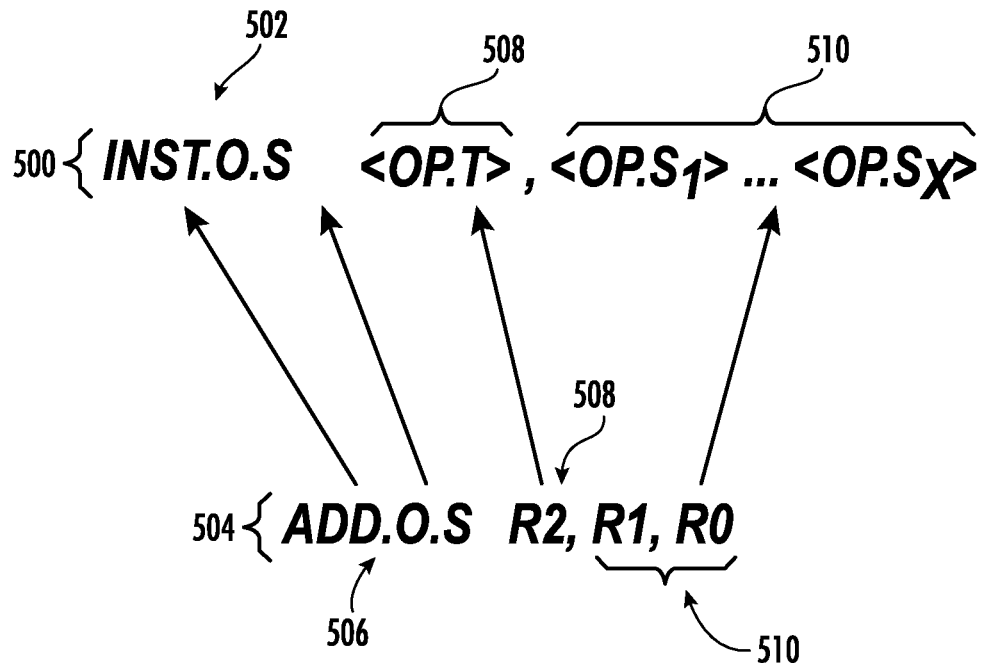
FIGS. 5A-5D illustrate examples of instruction formats for operand obsolescence register-encoded instructions that can be processed by the processor in FIG. 2 to cause the processor to set an obsolescence indicator to an obsolescent state for a source register.

FIG. 5A illustrates an exemplary instruction format 500 of a register obsolescent register-encoded instruction 502 according to an exemplary ISA. In this example, the instruction format 500 has an instruction type "INST.O.S". The '.O' extension in the instruction type INST signifies to the processor 210 that the instruction 502 has obsolescent register-encoded information. The '.S' extension in the instruction type INST signifies to the processor 210 that the instruction 502 has encoding to obsolete all the source registers identified by the source register operands. The instruction format 500 includes a target register operand OP.T 508. The instruction format 500 also includes one or more source register operands $OP.S_1$-$OP.S_X$ 510 which signifies 'X' number of source register operands. In this example, the '.O.S' extension appended in the instruction type INST signifies that all source registers identified by the source register operands $OP.S_1$-$OP.S_X$ 510 are to be made obsolescent by the processor 210. FIG. 5A also illustrates an example of an ADD instruction 504 encoded with instruction type "ADD.O.S" according to the instruction format 500 that names a target source operand R2 and two source register operands R1 and R0 to be made obsolete. As one example, the processor 210 could be configured to make obsolete the source registers identified by the source register operands $OP.S_1$-$OP.S_X$ 510 after the register obsolescent register-encoded instruction 502 is executed.

Figure 5B:
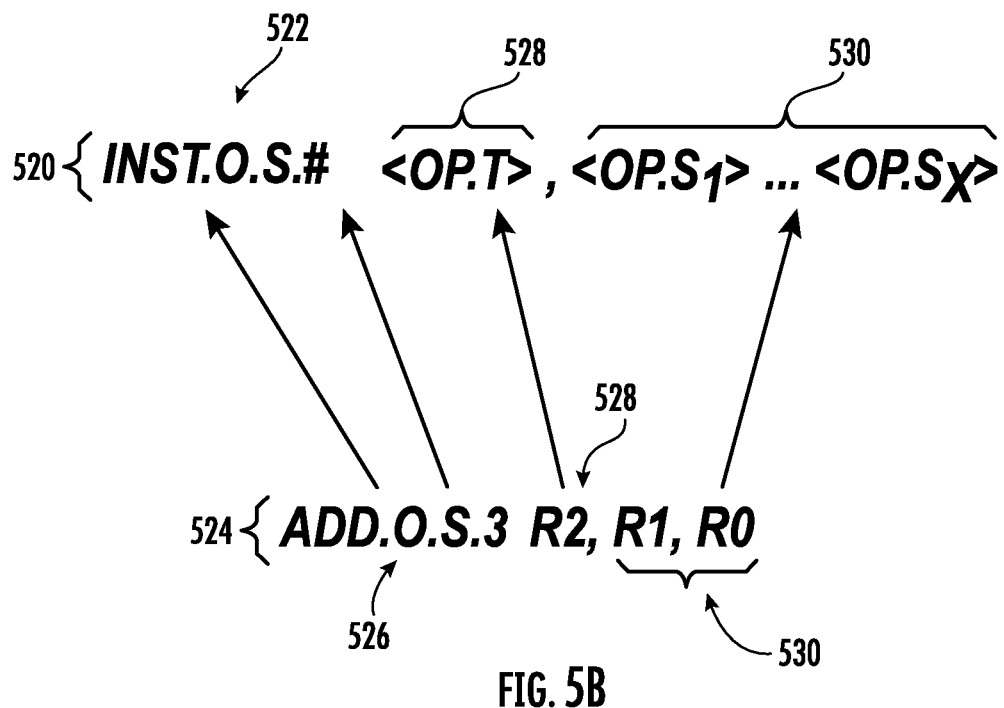

FIG. 5B illustrates another exemplary instruction format 520 of a register obsolescent register-encoded instruction 522 according to an exemplary ISA. In this example, the instruction format 520 has an instruction type "INST.O.S.#". The '.O' extension in the instruction type INST signifies to the processor 210 that the instruction 522 has obsolescent register-encoded information. The '.S' extension in the instruction type INST signifies to the processor 210 that the instruction 522 has encoding to obsolete all the source registers identified by the source register operands. The '.#' extension in the instruction type INST signifies to the processor 210 that the source register identified by the source register operand to be obsoleted is to be obsoleted by the processor 210 after the instruction following the identified number (#) of instructions is executed by the processor 210. The instruction format 520 includes one or more source register operands $OP.S_1$-$OP.S_X$ 530 which signifies 'X' number of source register operands. The instruction format 520 includes a target register operand OP.T 528. FIG. 5A also illustrates an example of an ADD instruction 524 encoded with instruction type "ADD.O.S.3" 526 according to the instruction format 520 that names a target source operand R2 and two source register operands R1 and R0 to be made obsolete. The encoding of the ADD instruction 524 instructs the processor 210 to obsolete the source registers identified by the source register operands R1, R0 to be obsoleted following execution of the third instruction following the ADD instruction 524 in an instruction stream.

Figure 5C:
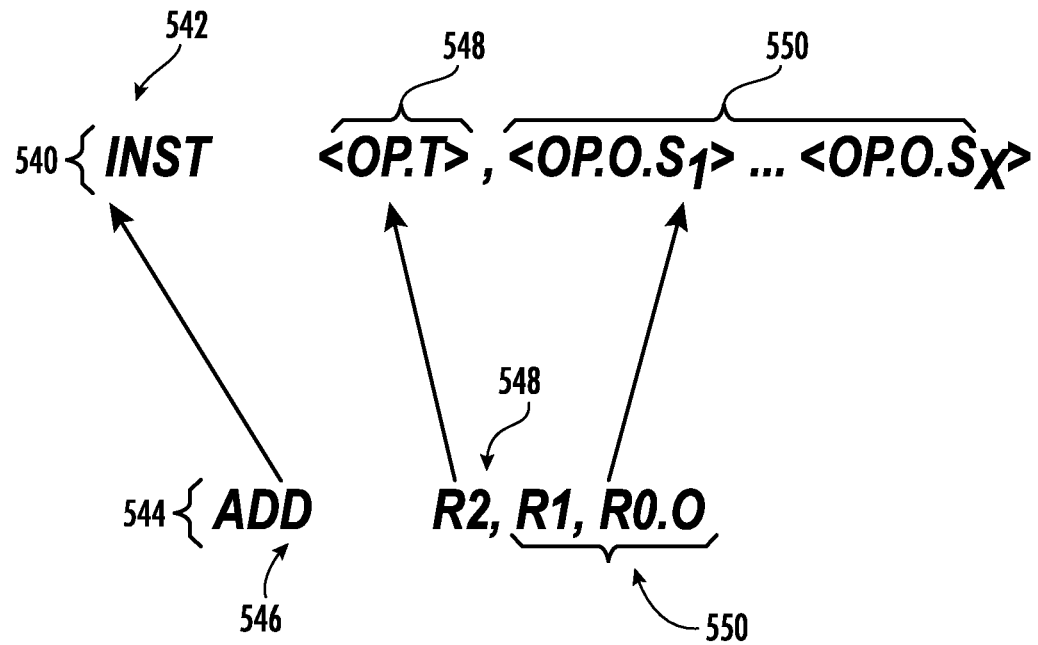

FIG. 5C illustrates another exemplary instruction format 540 of a register obsolescent register-encoded instruction 542 according to an exemplary ISA. In this example, the instruction format 540 has an instruction type INST without the obsolescence encoding extension '.O' like the instruction format 500 in FIG. 5A. The instruction format 540 includes one or more source register operands $OP.O.S_1$-$OP.O.S_X$ 550 which signifies 'X' number of source register operands. The '.O' extension is optional and is used when it is desired to encode the instruction 542 to signify that the source register identified by such encoded source register operand is to be made obsolete. The instruction format 540 includes a target register operand OP.T 548 which in this example is register R2. FIG. 5C also illustrates an example of an ADD instruction 544 encoded with instruction type 'ADD' 546 according to the instruction format 540 that names source register R0 to be made obsolete. This is encoded by the source register operand encoding 'R0.O' in the ADD instruction 544.

Figure 5D:
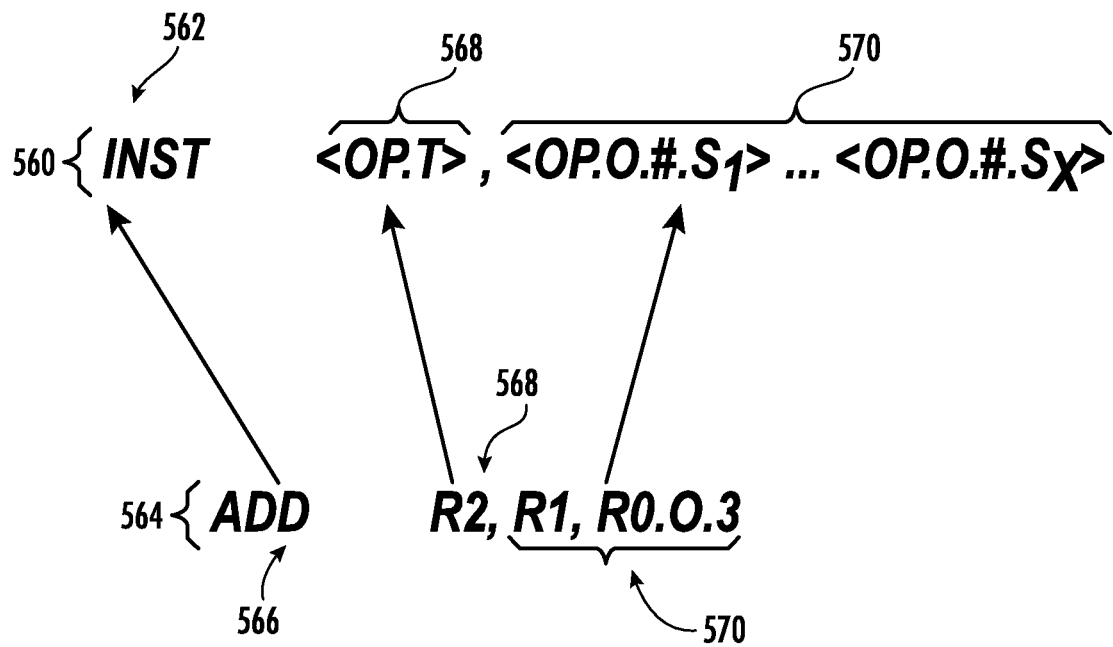

FIG. 5D illustrates another exemplary instruction format 560 of a register obsolescent register-encoded instruction 562 according to an exemplary ISA. In this example, the instruction format 560 has an instruction type INST without the obsolescence encoding extension '.O' like the instruction format 500 in FIG. 5A. The instruction format 560 includes one or more source register operands $OP.O.\#.S_1$-$OP.O.\#.S_X$ 570 which signifies 'X' number of source register operands. The '.O' extension is optional and is used when it is desired to encode the instruction 562 to signify that the source register identified by such encoded source register operand is to be made obsolete. The '.#' extension in the instruction type INST signifies to the processor 210 that the source register identified by the source register operand to be obsoleted is to be obsoleted by the processor 210 after the instruction following the identified number (#) of instructions is executed by the processor 210. The instruction format 560 includes a target register operand OP.T 568 which in this example is register R2. FIG. 5D also illustrates an example of an ADD instruction 564 encoded with instruction type 'ADD' 566 according to the instruction format 560 that register R0 to be made obsolete after the processor 210 executes three (3) instructions following the ADD instruction 564 in the instruction stream. This is encoded by the source register operand encoding 'R0.O.3' in the ADD instruction 564.

FIG. 6 is a flowchart illustrating an exemplary process 600 that can be performed by the processor 210 in FIG. 2 to process obsolescence register-encoded instructions to set an obsolescence indicator for a source register encoded as being obsolescent. The process includes the processor 210 receiving a plurality of instructions 306 in an instruction stream 314 from an instruction memory 312 or instruction cache memory 310 to be executed (block 602 in FIG. 6). The instructions 306 can include at least one instruction that includes a register operand as a source and/or target operand. The processor 210 processes the instructions 306 in its instruction processing circuit 300 (block 604 in FIG. 6). The processor 210 can also be configured to determine if the processed instruction 306 includes a source register operand (block 606 in FIG. 6). In response to determining the processed instruction 306 includes a source register operand (block 608 in FIG. 6), the processor 210 can optionally be configured to first determine if the obsolescence indicator 346(0)-346(P) associated with the source register R0-RP associated with the source register operand in the processed instruction 306 indicates an obsolescent state (block 610 in FIG. 6). If so, this means that the source register indicated as being obsolescent should not be used to execute the instruction 306. In response to determining the obsolescence indicator 346(0)-346(P) associated with the source register R0-RP associated with the source register operand in the processed instruction 306 indicates an obsolescent state (block 612 in FIG. 6), the processor 210 can generate an exception or use a default value for the value of the source operand, as examples, for the processed instruction 306 (block 614 in FIG. 6), and the process ends (block 620 in FIG. 6). Alternatively, the processor 210 could be configured to generate and return a predetermined data value (e.g., all zeros) for a processed instruction 306 that names the source register operand associated with a source register R0-RP being in an obsolescent state.

However, in response to determining the obsolescence indicator 346(0)-346(P) associated with the source register R0-RP associated with the source register operand in the processed instruction 306 does not indicate an obsolescent state (block 612 in FIG. 6), the processor 210 determines if a processed instruction 306 includes an obsolescence encoding that identifies at least one register operand associated with at least one logical register R0-RP in the processor 210 to be obsoleted (block 616 in FIG. 6). In response to the processor 210 determining that the processed instruction 306 includes an obsolescence encoding identifying at least one register operand to be obsoleted, the processor 210 sets the obsolescence indicator 346(0)-346(P) associated with the logical register R0-RP associated with the register operand identified to be obsoleted in an obsolescent state to indicate that the data value stored in such logical register R0-RP is obsolete (block 618 in FIG. 6), and the process ends (block 620 in FIG. 6). As one example, the processor 210 may be configured to set an obsolescence indicator 346(0)-346(P) associated with the logical register R0-RP associated with the register operand identified to be obsoleted in an obsolescent state once it has been determined that the instruction identifying the register operand to be obsoleted has itself been committed or executed. This information may be provided by the scheduler circuit 330 for example in the instruction processing circuit 300 in FIG. 3.

The processor 210 can also be configured to set an obsolescence indicator 348(0)-348(P) associated with the processed instruction 306 entered in a ROB entry 338(1)-338(N) in the ROB 336 to be consulted in the event of an instruction flush where the ROB 336 is used to restore the RMT 322.

As previously discussed and discussed below, the processor 210 can also consult the obsolescence indicator 346(0)-346(P) when processed instructions 306 that include a source register operand naming a logical register R0-RP as a source to determine if the data value stored in the source logical register R0-RP is obsolete. The source logical register R0-RP should not be obsolete, because the instruction stream 314 is supposed to only have obsolescence register-encoded instructions 306 that encode a logical register R0-RP for obsoletion when it is known that no other access will be made to the logical register R0-RP in a subsequent instruction as a source before the logical register R0-RP is overwritten. For example, a compiler or programmer is charged with encoding instructions as obsolescence register-encoded instructions 306 when it is known that no other instruction names the obsoleted logical register R0-RP as a source operand in a subsequent instruction before the logical register R0-RP is overwritten. However, in case an error is introduced by a programmer, compiler, or other source, the processor 210 can also be configured to generate an exception in response to an instruction 306 being processed that names a logical register R0-RP as a source operand that is determined to be obsolete based on its associated obsolescence indicator 346(0)-346(P).

If a subsequent processed instruction 306 by the processor 210 is an instruction that names a target register operation for a logical register R0-RP to be written, the processor 210 can be also configured to set the obsolescence indicator 346(0)-346(P) associated with the target register R0-RP associated with the target register operand to a non-obsolescent state. This is because the data value written by the processor 210 into the target register R0-RP associated with the target register operand of the subsequent instruction 306 is current and not obsolete. In this manner, if the logical register R0-RP that is written is named in a source register operand in a subsequent instruction 306 to be executed, the data value stored in the logical register R0-RP will not be returned and an exception or predetermined data value is returned instead, as discussed above.

As discussed above, the recording of a logical register R0-RP as obsolete based on the processing of an obsolescence register-encoded instruction 306 in the processor 210 can be useful for other applications. For example, a logical register R0-RP being in an obsolescent state allows the processor 210 to determine such state and to ignore the data value stored in such logical register R0-RP for improved performance. For example, data values stored in logical register R0-RP indicated as being in an obsolescent state according to their respective obsolescence indicator 346(0)-

346(P) can be ignored and not stored in a saved context for a process being switched out, thus conserving memory and improving processing time to perform a process switch. For example, the operating system software executed by the processor 210 can cause the processor 210 to determine a currently executed process is scheduled to be switched out for a next process. In response, the processor 210 can be configured to store a current context for the currently executing process. The stored context can include the data values stored in the logical registers R0-RP in the PRF 326 as well as the mapping information PR(0)-PR(P) stored in the RMT 322. In this manner, when the currently executed process that is switched out is later switched back into the instruction processing circuit 300 to be executed, the state of the processor 210 for such process that includes the previously stored logical registers R0-RP in the PRF 326 as well as the mapping information PR(0)-PR(P) stored in the RMT 322 can be restored. In this manner, the obsolescence indicator 346(0)-346(P) for each logical register R0-RP can be consulted to determine if it indicates an obsolescent state when saving the current context. The data value for any logical register R0-RP having an associated obsolescence indicator 346(0)-346(P) indicating an obsolescent state can be ignored and not saved so as to save memory storage space and conserve memory access processing time in process switching.

As another example of a processor 210 being able to ignore data values associated with logical register R0-RP indicated in an obsolescent state, the processor 210 may be configured to release renamed physical registers 324(0)-324(X) in the PRF 326 that are mapped to logical registers R0-RP having an obsolescent state so that such renamed physical registers 324(0)-324(X) can be reallocated before being overwritten. This can reduce the possibility of not having an available physical register 324(0)-324(X) for an instruction 306 being processed that has a target register, which may incur a pipeline stall until a physical register 324(0)-324(X) becomes available. In response to the processor 210 determining that a processed instruction 306 includes a target register operand associated with a logical register R0-RP that is in an obsolescent state, the processor 210 can be configured to reclaim a mapping information PR(0)-PR(P) in the RMT 322 associated with the target logical register R0-RP to be available for renaming for another target operand in another processed instruction 306. As yet another example of a processor 210 being able to ignore data values associated with a logical register R0-RP indicated in an obsolescent state, the processor 210 may be configured to ignore and not use data values stored in physical registers 324(0)-324(X) associated with a logical register R0-RP having an obsolescent state for speculative use of such data values when processing subsequent instructions, because such data values may be invalid. This can reduce re-execution processing that may occur as a result of using an invalid data value as a source value of an instruction 306.

As discussed above, the processor 210 can be configured to set an obsolescence indicator 348(1)-348(P) in the ROB 336 to be used to recover the state of the RMT 322 in response to an exception that causes an instruction flush. In this regard, FIG. 7 is an illustration of the RMT 322, the ROB 336, the CMT 340, and the mapping control circuit 342 of the instruction processing circuit 300 in FIG. 3. When a flush occurs due to an interrupting instruction 306, as discussed above, the instruction processing circuit 300 provides a flush indicator 347 indicating a flush of one or more instructions 306 in the instruction processing circuit 300.

The instruction processing circuit 300 also provides the ROB index of the ROB entry 338(1)-338(N) of the interrupting instruction 306, which may be referred to herein as the "interrupting instruction indicator." The flush indicator 347 and the interrupting instruction indicator are received by the RRRC 344 to control the RMT flush recovery. The interrupting instruction indicator points to the ROB index of the ROB entry 338(1)-338(N) of the interrupting instruction 306 that caused the flush. Based on the interrupting instruction indicator, an oldest flushed instruction entry, identified by an oldest flush instruction pointer, indicates the oldest instruction in the ROB 336 that is to be flushed. In recovery of the RMT 322, the oldest flushed instruction 306 indicated by the oldest flushed instruction entry in a ROB entry 338(1)-338(N) and any younger instructions identified in the ROB 336 will be flushed. The interrupting instruction 306 may be the oldest instruction to be flushed depending on the instruction type of the interrupting instruction 306. Alternatively, the interrupting instruction 306 may not be flushed, depending on the instruction type. In this case, the interrupting instruction 306 is the youngest surviving instruction. Any logical register-to-physical register mapping changes that resulted from a flushed instruction must be negated (i.e., undone) to restore the RMT 322 to the desired previous state. As discussed above, the processor 210 can be configured to also check the obsolescence indicator 348(0)-348(P) in the instructions in ROB entries 338(1)-338(N) that are not determined to be flushed to ensure that their respective instructions are not obsolete. If they are obsolete, then such instructions should also be flushed to restore the RMT 322.

With further reference to FIG. 7, an example state of the RMT 322, the ROB 336, and the CMT 340 are shown. The RMT 322 in FIG. 7 has entry assignments for logical registers R0-R5. The column entries in each row indicate, for each of the logical registers R0-R5, a logical register number (LOG), a physical register number (PHY) to which the logical register R0-R5 is mapped, and a ROB index (IDX) of the ROB entry 338(1)-338(N) of the instruction 306 that resulted in the logical register-to-physical register mapping of the logical register R0-R5. The ROB 336 is a table including a row for each ROB entry 338(1)-338(N). Each of the ROB entries 338(1)-338(N) include a respective index (IDX), a logical register number (LOG) of the logical register R0-RP whose mapping was changed by the instruction 306 associated with the ROB entry 338(1)-338(N), the new physical register (P_NEW) to which the logical register R0-RP is mapped, and the old physical register (P_OLD) to which the logical register R0-RP was previously mapped. The ROB 336 is shown with ROB entries 338(1)-338(N) having ROB indexes A-I. The CMT 340 includes entries for each logical register R0-RP with logical registers R0-R5 shown. Each entry in the CMT 340 includes a logical register number (LOG) and the corresponding physical register (PHY) to which its associated logical register R0-RP is mapped.

Information about any logical register-to-physical register mapping of logical registers R0-RP is updated since the last committed instruction 306 is stored in the ROB entries 338(1)-338(N) in program order. The logical register-to-physical register mapping of each of the logical registers R0-RP whose mapping was updated as a result of an instruction 306 to be flushed must be recovered to the state of the mapping that existed at the time of the interrupting instruction 306. Each ROB entry 338(1)-338(N) contains information about the logical register mapping change that resulted from the particular instruction 306 to which that ROB entry 338(1)-338(N) is allocated. Because the information in a ROB entry 338(1)-338(N) includes both the new physical register (P_NEW) and the old physical register (P_OLD) to which a logical register R0-RP is mapped, the information from the ROB entries 338(1)-338(N) can be used to negate ("undo") or recreate ("redo") the logical mapping of any logical register(s) R0-RP updated since the last committed instruction 306. All ROB entries 338(1)-338(N) having a ROB index from the oldest flushed instruction 306 and younger may have changed the logical register-to-physical register mapping of a logical register R0-RP. Therefore, when a flush indicator 347 is received from the instruction processing circuit 300, the ROB indexes associated with each logical register map in the RMT 322 are compared to the oldest flush instruction pointer to identify all of the logical registers R0-RP that were mapped to a new physical register P0-PX as a result of an instruction 306 that is to be flushed.

Figure 8:
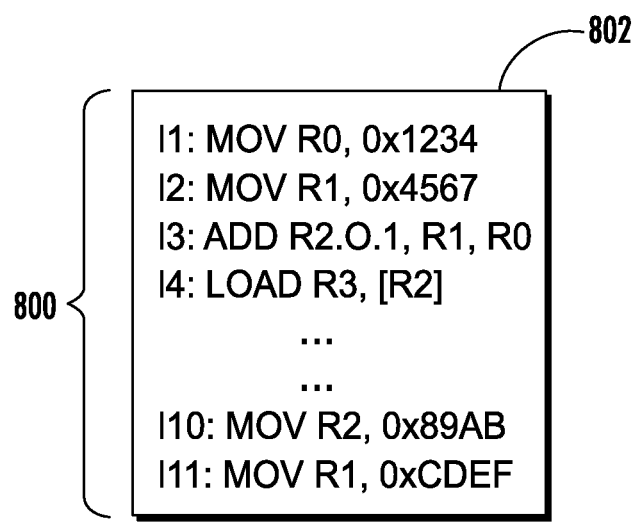
FIG. 8 is another set of computer software instructions that can be executed by a processor as an instruction stream, wherein the computer software instructions include an obsolescence register-encoded instruction encoded to instruct the processor to obsolete a target register identified by a target register operand.

Instructions can also be encoded as obsolescence register-encoded instructions to instruct the processor 210 to obsolete a target register that will be used as source register by a subsequent instruction 306. For example, FIG. 8 is a set of computer software instructions 800 of an instruction stream 802 that can be executed by the instruction processing circuit 300 of the processor 210 in FIG. 3 as the instruction stream 314, wherein the computer software instructions 800 include obsolescence register-encoded instructions. The computer software instructions 800 include instructions I1-I11 that include instructions that name GPRs as source and/or target operands. In this example, instructions I1 and I2 are move (MOV) instructions that move immediate values as data values into registers R0 and R1, respectively. These data values loaded in registers R0 and R1 are consumed by the add (ADD) instruction I3, which is an instruction, and that loads the data values stored in registers R0 and R1 and adds these two values together and stores (i.e., writes) the result in register R2.

As seen in the computer software instructions 800, register R2 written by add instruction I3 is named by a source register operand in the load (LOAD) instruction I4. Register R2 is not used as a source register in any other instructions after instruction I4 until the register R2 is overwritten by instruction I10. In this regard, in this example, instruction I3 is encoded as obsolescence register-encoded instruction. Target register operand R2 is encoded to be obsolete after instruction I4 executes. This is noted in this example by "R2.O.1" encoded for the target register operand R2 in instruction I3 where the 'O' signifies obsoletion of logical register R2 to processor 210, and the '1' signifies for the processor 210 to obsolete register R2 after the next one (1) instruction in the instruction stream 802 is executed, meaning instruction I4 in this example.

FIG. 9A illustrates another exemplary instruction format 900 of a register obsolescent register-encoded instruction 902 according to an exemplary ISA. In this example, the instruction format 900 has an instruction type INST. The instruction format 900 includes a target register operand OP.T.O.#908 in the instruction 902. The 'O' in target register operand OP.T.O.#908 signifies an obsolescence encoding of the target register OP.T, and the '#' is encoded with a number signifying the number of subsequent instructions in an instruction stream following the instruction encoded with the instruction format 900 to obsolete the named target register OP.T. The instruction format 900 also includes one or more source register operands OP.S$_1$-OP.S$_X$ 910 which signifies 'X' number of source register operands. FIG. 9A also illustrates an example of an ADD instruction 904. In the example of the instruction 904, there are two source register operands R1 and R0. The ADD instruction 904 is encoded with instruction type 'ADD' 906 according to the instruction format 900 that names a target register R2 to be made obsolete. This is encoded by the source register operand encoding 'R2.O.1' in the ADD instruction 904. The encoding of '.1' signifies the number of subsequent instructions in an instruction stream following the ADD instruction 904 to obsolete the named target register R2.

FIG. 9B illustrates another exemplary instruction format 920 of a register obsolescent register-encoded instruction 922 according to an exemplary ISA. In this example, the instruction format 920 has an instruction type INST. The instruction format 920 includes a target register operand OP.T.O.E #928 in the instruction 922. The 'O' in target register operand OP.T.O.E #928 signifies an obsolescence encoding of the target register OP.T, and the "E #" is encoded with an event number corresponding to an event that occurs in the processor 210 that when occurs, triggers the processor 210 to obsolete the named target register OP.T. Examples of such events include a next read of the register. For example, a given instruction can declare that its target register becomes obsolete upon the completion of the next instruction that reads such register, as opposed to the instruction format 900 in FIG. 9A example where the target register becomes obsolete after the completion of '#' subsequent instructions. The instruction format 920 also includes one or more source register operands OP.S$_1$-OP.S$_X$ 930 which signifies 'X' number of source register operands. In the example of the instruction 922, there are two source register operands R1 and R0. FIG. 9B also illustrates an example of an ADD instruction 924 encoded with instruction type 'ADD' 926 according to the instruction format 920 that names a target register R2 to be made obsolete. This is encoded by the source register operand encoding 'R2.O.E4' in the ADD instruction 544. The encoding of '.E4' signifies event number '4' and that the processor 210 is to obsolete target register R2 after event number '4' occurs.

FIG. 10 is a block diagram of an exemplary processor-based system 1000 that includes a processor 1002 (e.g., a microprocessor) that includes an instruction processing circuit 1004 configured to process an obsolescence register-encoded instruction indicating one or more registers to be made obsolescent and setting an obsolescence indicator(s) for such registers to cause the data value stored in such registers to be ignored, including but not limited to the processor 210 and instruction processing circuit 300 in FIGS. 2, 3, and 7. The instruction processing circuit 1004 can be the instruction processing circuit 300 in FIGS. 3 and 7 as examples. The processor-based system 1000 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer.

In this example, the processor-based system 1000 includes the processor 1002. The processor 1002 represents one or more general-purpose processing circuits, such as a microprocessor, central processing unit, or the like. More particularly, the processor 1002 may be an EDGE instruction set microprocessor, or other processor implementing an instruction set that supports explicit consumer naming for communicating produced values resulting from execution of producer instructions. The processor 1002 is configured to execute processing logic in instructions for performing the operations and steps discussed herein. In this example, the processor 1002 includes an instruction cache 1008 for temporary, fast access memory storage of instructions accessible by the instruction processing circuit 1004. Fetched or prefetched instructions from a memory, such as from a main memory 1010 over a system bus 1012, are stored in the instruction cache 1008. The instruction processing circuit 1004 is configured to process instructions fetched into the instruction cache 1008 and process the instructions for execution. The processor 1002 can include a local cache memory 1014 to store cached data in the main memory 1010. Cache memory 1016 outside the processor 1002 between the local cache memory 1014 and the main memory 1010 can also be provided to provide a cache memory system 1018.

The processor 1002 and the main memory 1010 are coupled to the system bus 1012 and can intercouple peripheral devices included in the processor-based system 1000. As is well known, the processor 1002 communicates with these other devices by exchanging address, control, and data information over the system bus 1012. For example, the processor 1002 can communicate bus transaction requests to a memory controller 1019 in the main memory 1010 as an example of a slave device. Although not illustrated in FIG. 10, multiple system buses 1012 could be provided, wherein each system bus constitutes a different fabric. In this example, the memory controller 1019 is configured to provide memory access requests to a memory array 1020 in the main memory 1010. The memory array 1020 is comprised of an array of storage bit cells for storing data. The main memory 1010 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 1012. As illustrated in FIG. 10, these devices can include the main memory 1010, one or more input device(s) 1022, one or more output device(s) 1024, a modem 1026, and one or more display controllers 1028, as examples. The input device(s) 1022 can include any type of input device, including but not limited to input keys, switches, voice processors, etc. The output device(s) 1024 can include any type of output device, including but not limited to audio, video, other visual indicators, etc. The modem 1026 can be any device configured to allow exchange of data to and from a network 1030. The network 1030 can be any type of network, including but not limited to a wired or wireless network, a private or public network, a local area network (LAN), a wireless local area network (WLAN), a wide area network (WAN), a BLUETOOTH™ network, and the Internet. The modem 1026 can be configured to support any type of communications protocol desired. The processor 1002 may also be configured to access the display controller(s) 1028 over the system bus 1012 to control information sent to one or more displays 1032. The display(s) 1032 can include any type of display, including but not limited to a cathode ray tube (CRT), a liquid crystal display (LCD), a plasma display, etc.

The processor-based system 1000 in FIG. 10 may include a set of instructions 1034 to be executed by the processor 1002 for any application desired according to the instructions. The instructions 1034 may include obsolescence register-encoded instructions and may be stored in the main memory 1010, processor 1002, and/or instruction cache 1008 as examples of a non-transitory computer-readable medium 1036. The instructions 1034 may also reside, completely or at least partially, within the main memory 1010 and/or within the processor 1002 during their execution. The instructions 834 may further be transmitted or received over the network 1030 via the modem 1026, such that the network 1030 includes computer-readable medium 1036.

While the computer-readable medium 1036 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor configured to:
   receive a plurality of instructions in an instruction stream from an instruction memory to be executed, the plurality of instructions comprising at least one instruction that includes a register operand;
   process an instruction among the plurality of instructions;
   determine if the processed instruction includes an obsolescence encoding identifying at least one register operand associated with at least one register among a plurality of registers in the processor to be obsoleted;
   in response to determining the processed instruction includes the obsolescence encoding identifying at least one register operand to be obsoleted, set an obsolescence indicator associated with the at least one register associated with the at least one register operand to an obsolescent state indicating the at least one register is obsolete;
   determine if the processed instruction includes a source register operand;
   in response to determining the processed instruction includes the source register operand, determine if the obsolescence indicator associated with a source register associated with the source register operand indicates an obsolescent state:
      in response to determining the obsolescence indicator associated with the source register associated with the source register operand indicating an obsolescent state:
         return a default value as a data value for the source register to be used to execute the processed instruction; and
         execute the processed instruction using the default value as the data value for the source register named by the source register operand.

2. The processor of claim 1 further configured to, in response to determining the obsolescence indicator associated with the source register associated with the source register operand indicating an obsolescent state:
   generate an exception for the processed instruction.

3. The processor of claim 1 further configured to execute an operating system process to:
   determine that a current process in the processor is to be switched out to a next process to be executed in the processor;
   in response to determining that the current process in the processor is to be switched out to the next process to be executed in the processor, store a current context for the current process comprising, for each physical register among a plurality of physical registers in the processor:
      determine if the obsolescence indicator is set to an obsolescent state for the physical register; and in response to the obsolescence indicator being set to an obsolescent state for the physical register:
not store a data value in the physical register in the current context for the current process.

4. The processor of claim 1, further comprising:
a plurality of physical registers each configured to store a data value;
a register map table comprising a plurality of mapping entries associated with a respective plurality of logical registers, each mapping entry among the plurality of mapping entries configured to store mapping information mapping its respective logical register to a physical register among the plurality of physical registers;
the processor further configured to:
determine if the processed instruction includes a target register operand; and
in response to determining the processed instruction includes the target register operand:
rename a mapping entry among the plurality of mapping entries in the register map table for a logical register associated with the target register operand, to a logical register among the plurality of logical registers; and
the processor configured to:
in response to determining the processed instruction includes the obsolescence encoding identifying at least one register operand to be obsoleted, reclaim at least one mapping entry among the plurality of mapping entries in the register map table associated with the at least one register operand.

5. The processor of claim 1 configured to, in response to determining the processed instruction includes the obsolescence encoding identifying at least one register operand to be obsoleted:
determine if all instructions among the plurality of instructions that are dependent on the at least one register associated with the at least one register operand have been committed; and
in response to determining all instructions among the plurality of instructions that are dependent on the at least one register associated with the at least one register operand have been committed:
set the obsolescence indicator associated with the at least one register associated with the at least one register operand to an obsolescent state indicating the at least one register is obsolete.

6. The processor of claim 1 further configured to:
determine if the processed instruction is an instruction having a target register operand; and
in response to determining the processed instruction is an instruction having the target register operand:
write a data value indicated by the processed instruction for the target register operand to a target register among the plurality of registers associated with the target register operand; and
set the obsolescence indicator associated with the at least one register associated with the target register operand to a non-obsolescent state indicating the target register is not obsolete.

7. The processor of claim 1, wherein the plurality of registers comprise a plurality of general purpose registers (GPRs).

8. The processor of claim 1, further comprising:
a plurality of physical registers each configured to store a data value; and
a register map table comprising a plurality of mapping entries associated with a respective plurality of logical registers, each mapping entry among the plurality of mapping entries configured to store mapping information mapping its respective logical register to a physical register among the plurality of physical registers, and a plurality of obsolescence indicators wherein each obsolescence indicator among the plurality of obsolescence indicators is associated with a mapping entry among the plurality of mapping entries;
the processor configured to, in response to determining the processed instruction includes the obsolescence encoding identifying at least one register operand to be obsoleted, set an obsolescence indicator in the register map table associated with the logical register associated with the at least one register operand to an obsolescent state indicating the logical register is obsolete.

9. The processor of claim 8, further comprising a reorder buffer comprising a plurality of reorder buffer (ROB) entries each allocated to a processed instruction in the processor that has not yet been committed, each ROB entry among the plurality of ROB entries further comprising an obsolescence indicator configured to store an obsolescent state;
the processor further configured to, in response to determining the processed instruction includes the obsolescence encoding identifying at least one register operand to be obsoleted, set an obsolescence indicator in a ROB entry in the reorder buffer having an instruction having a register operand associated with the logical register to be obsoleted.

10. The processor of claim 9 further configured to:
receive a flush indicator indicating a flush event for one or more instructions in the processor based on an interrupting instruction;
in response to receiving the flush indicator, determine if the instructions in ROB entries in the reorder buffer older than the interrupting instruction have an obsolescence indicator indicating an obsolescent state for a logical register; and
in response to the instructions in the ROB entries in the reorder buffer older than the interrupting instruction having the obsolescence indicator indicating the obsolescent state, recover the plurality of mapping entries in the register map table back to a next oldest ROB entry to the ROB entries in the reorder buffer older than the next oldest ROB entry having the obsolescence indicator indicating the obsolescent state, to a previously mapping information.

11. The processor of claim 1 configured to:
determine if the processed instruction includes the obsolescence encoding identifying at least one register operand associated with at least one register among the plurality of registers to be obsoleted following execution of the instruction in the instruction stream following the processed instruction; and
in response to determining the processed instruction includes the obsolescence encoding identifying at least one register operand to be obsoleted, set the obsolescence indicator associated with the at least one register associated with the at least one register operand to an obsolescent state indicating the at least one register is obsolete after execution of the processed instruction.

12. The processor of claim 1 configured to:
determine if the processed instruction includes the obsolescence encoding identifying all register operands associated with at least one register among the plurality of registers to be obsoleted following execution of the instruction in the instruction stream following the processed instruction; and in response to determining the processed instruction includes the obsolescence encoding identifying all register operands to be obsoleted, set an obsolescence indicator associated with registers associated with each of the register operands to an obsolescent state indicating the at least one register is obsolete after execution of the processed instruction.

13. The processor of claim 1 configured to:
   determine if the processed instruction comprising a processed instruction includes the obsolescence encoding identifying at least one register operand associated with at least one register among the plurality of registers to be obsoleted following a number of instructions in the instruction stream following the processed instruction in the instruction stream; and
   in response to determining the processed instruction includes the obsolescence encoding identifying at least one register operand to be obsoleted following the number of instructions in the instruction stream following the processed instruction in the instruction stream, set the obsolescence indicator associated with the at least one register associated with the at least one register operand to an obsolescent state indicating the at least one register is obsolete after execution of instructions in the instruction stream following the processed instruction in the instruction stream by the number of instructions.

14. The processor of claim 1 configured to:
   determine if the processed instruction comprising a processed instruction includes the obsolescence encoding identifying at least one register operand associated with at least one register among the plurality of registers to be obsoleted following an occurrence of an event; and
   in response to determining the processed instruction includes the obsolescence encoding identifying at least one register operand to be obsoleted following a number of instructions in the instruction stream following the occurrence of the event:
      in response to the occurrence of the event, set the obsolescence indicator associated with the at least one register associated with the at least one register operand to an obsolescent state indicating the at least one register is obsolete.

15. A method of obsoleting a data value stored in a register in a processor, comprising:
   receiving a plurality of instructions in an instruction stream from an instruction memory to be executed, the plurality of instructions comprising at least one computer instruction that includes a register operand;
   processing an instruction among the plurality of instructions;
   determining if the processed instruction includes an obsolescence encoding identifying at least one register operand associated with at least one register among a plurality of registers in the processor to be obsoleted; and
   in response to determining the processed instruction includes the obsolescence encoding identifying at least one register operand to be obsoleted, setting an obsolescence indicator associated with the at least one register associated with the at least one register operand to an obsolescent state indicating the at least one register is obsolete;
   determining if the processed instruction includes a source register operand;
   in response to determining the processed instruction includes the source register operand, determining if the obsolescence indicator associated with a source register associated with the source register operand indicates an obsolescent state:
      in response to determining the obsolescence indicator associated with the source register associated with the source register operand indicating an obsolescent state:
         returning a default value as a data value for the source register to be used to execute the processed instruction; and
         executing the processed instruction using the default value as the data value for the source register named by the source register operand.

16. The method of claim 15 further comprising, in response to determining the obsolescence indicator associated with the source register associated with the source register operand indicating an obsolescent state:
   generating an exception for the processed instruction.

17. The method of claim 15, further comprising:
   determining that a current process in the processor is to be switched out to a next process to be executed in the processor; and
   in response to determining that the current process in the processor is to be switched out to the next process to be executed in the processor, storing a current context for the current process comprising, for each physical register among a plurality of physical registers in the processor:
      determining if an obsolescence indicator is set to an obsolescent state for the physical register; and
      in response to the obsolescence indicator being set to an obsolescent state for the physical register:
         not storing a data value in the physical register in the current context for the current process.

18. The method of claim 15, further comprising:
   determining if the processed instruction includes a target register operand; and
   in response to determining the processed instruction includes the target register operand:
      renaming a mapping entry among a plurality of mapping entries in a register map table mapping its respective logical register to a physical register among the plurality of physical registers, for a logical register associated with the target register operand, to a logical register among a plurality of logical registers;
   and comprising:
      in response to determining the processed instruction includes the obsolescence encoding identifying at least one register operand to be obsoleted, reclaim at least one mapping entry among the plurality of mapping entries in the register map table associated with the at least one register operand.

19. The method of claim 15, comprising, in response to determining the processed instruction includes the obsolescence encoding identifying at least one register operand to be obsoleted:
   determining if all instructions among the plurality of instructions that are dependent on the at least one register associated with the at least one register operand have been committed; and
   in response to determining all instructions among the plurality of instructions that are dependent on the at least one register associated with the at least one register operand have been committed:
      setting the obsolescence indicator associated with the at least one register associated with the at least one register operand to an obsolescent state indicating the at least one register is obsolete.

20. The method of claim 15, wherein:

determining if the processed instruction includes the obsolescence encoding comprises determining if the processed instruction includes the obsolescence encoding identifying at least one register operand associated with at least one register among the plurality of registers to be obsoleted following execution of the instruction in the instruction stream following the processed instruction; and in response to determining the processed instruction includes the obsolescence encoding identifying at least one register operand to be obsoleted, setting the obsolescence indicator associated with the at least one register associated with the at least one register operand to an obsolescent state indicating the at least one register is obsolete after execution of the processed instruction.

21. The method of claim 15, wherein:

determining if the processed instruction includes the obsolescence encoding comprises determining if the processed instruction includes the obsolescence encoding identifying all register operands associated with at least one register among the plurality of registers to be obsoleted following execution of the instruction in the instruction stream following the processed instruction; and in response to determining the processed instruction includes the obsolescence encoding identifying all register operands to be obsoleted, setting an obsolescence indicator associated with registers associated with each of the register operands to an obsolescent state indicating the at least one register is obsolete after execution of the processed instruction.

22. The method of claim 15, wherein:

determining if the processed instruction includes the obsolescence encoding comprises determining if the processed instruction comprising a processed instruction includes the obsolescence encoding identifying at least one register operand associated with at least one register among the plurality of registers to be obsoleted following a number of instructions in the instruction stream following the processed instruction in the instruction stream; and in response to determining the processed instruction includes the obsolescence encoding identifying at least one register operand to be obsoleted following the number of instructions in the instruction stream following the processed instruction in the instruction stream, setting the obsolescence indicator associated with the at least one register associated with the at least one register operand to an obsolescent state indicating the at least one register is obsolete after execution of instructions in the instruction stream following the processed instruction in the instruction stream by the number of instructions.

23. The method of claim 15, wherein:

determining if the processed instruction includes the obsolescence encoding comprises determining if the processed instruction comprising a processed instruction includes the obsolescence encoding identifying at least one register operand associated with at least one register among the plurality of registers to be obsoleted following an occurrence of an event; and in response to determining the processed instruction includes the obsolescence encoding identifying at least one register operand to be obsoleted following a number of instructions in the instruction stream following the occurrence of the event:

in response to the occurrence of the event, setting the obsolescence indicator associated with the at least one register associated with the at least one register operand to an obsolescent state indicating the at least one register is obsolete.

* * * * *